Patented Sept. 12, 1944

2,357,987

UNITED STATES PATENT OFFICE 2,357,987

MAGNESIUM COMPOSITIONS

Charles C. Winding, Ithaca, N. Y., assignor to Tide Water Associated Oil Company, Bayonne, N. J., a corporation of Delaware No Drawing. Application April 9, 1941,
Serial No. 387,607

7 Claims. (Cl. 23—67)

This invention relates to compositions comprising certain inorganic magnesium compounds having novel characteristics of form giving rise to new or enhanced properties. In one particular embodiment having special utility in the arts, the invention provides a magnesium oxide composition of unique form.

It is customary to prepare magnesium oxide by calcination of suitable magnesium compounds, generally a magnesium carbonate or a magnesium hydroxide, and various methods have been proposed. When a carbonate comprises the intermediate material which is to be calcined for the production of the oxide, familiar methods involve preparation of the carbonate intermediate by a metathesis involving reaction between a magnesium salt such as the chloride or sulphate and a compound yielding an available carbonate ion.

In general outline, therefore, magnesium oxide compositions may be prepared by a two-step process involving (1) preparation of synthetic or artificially produced magnesium carbonate, and (2) calcining or burning of such carbonate to the production of a magnesium oxide product by the elimination of carbon dioxide and water. In the prior art, specific modifications and special steps or controls have been developed within this general two-step procedure to the end of enhancing the purity of the ultimate product and, in some instances, obtaining special properties useful in particular application.

The magnesium oxide composition of the present invention has unique characteristics and properties making it particularly useful as an active agent in adsorbent processes, particularly adsorbent processes specially adapted to the refining of oils. It combines active decolorizing power in the treatment of petroleum fractions with a high filtering rate not heretofore available with magnesium oxide compositions of the prior art. One method of preparing a magnesium oxide composition having the form and properties embodied in compositions of the invention is described hereinafter and will be seen to comprise a novel order and control of steps and reactions in the general synthesis of the prior art.

Two predominant and distinguishing characteristics of the magnesium oxide composition provided by this invention are the nature or type of particle, and the narrow range of particle size distribution in a given mass. In general the individual particles in a given mass are of very small size but may vary considerably from mass to mass or batch to batch. That is to say, the average particle size may be relatively small or relatively large, but the range of variation in particle size of a preponderance of the particles throughout a given mass or batch of magnesium oxide according to the invention is definitely narrow or restricted. The new product is further identified by a materially higher density than is usual with magnesium oxide compositions of the prior art.

The individual particles are spherulitic, appearing as plate-like discs built up of small crystals radiating outwardly from the center of the disc.

The invention therefore provides a synthetic product or composition characterized by high uniformity of particle size in relation to the proportional distribution of variously sized particles in a given mass, a spherulitic or plate-like disc form of particle in unusual uniformity of size distribution, as immaterial minimum proportion of "fines," and a high density.

By way of general example, from which no limitation is to be inferred, magnesium oxide compositions under the invention may comprise masses in which the average particle size of the particles present may fall within an illustrative overall range of 2 to 30 michons, but in which the proportional distribution of particle size throughout 90% or more of the particles in a given mass involves a deviation of not more than about 4 or 5 microns. The individual particles will be spherulitic in form and there will be no material proportion of "fines" present. The apparent density will be of the order of 20 pounds per cubic foot. An illustrative composition having properties as just aforesaid provides an excellent and active agent for the decolorizing refining of petroleum oils to lubricating stocks, in which application the composition serves with particular utility by reason of the high filtering rate obtained.

Thus, a given batch or mass might comprise a group of magnesium oxide particles about 40% of which have an average diameter of 3 microns and about 55% of which have an average diameter of 5 microns. Again, another batch might show a particle size distribution of about 65% with an average diameter of 12 microns and about 20% with an average diameter of 17 microns. Still another batch might show about 45% of the particles having an average diameter of 6 microns and about 50% having an average diameter of 10 microns.

As indicated hereinabove, the magnesium compounds of the invention are produced by a novel order and control of steps and reactions. One method, described more particularly in the following example, for preparing these magnesium compounds, comprises precipitating a basic magnesium carbonate having spherulitic or plate-like form of particles of uniform size distribution and calcining this carbonate to form a magnesium oxide the particles of which are pseudomorphs of those of the carbonate. The conditions for precipitating the carbonate are controlled so as to give particles of the desired shape and size distribution. Generally, the process comprises reacting together a solution of a soluble magnesium salt and a solution of a soluble carbonate to produce a slurry of basic magnesium carbonate, allowing the basic magnesium carbonate slurry to stand for a period of time and subsequently filtering. The basic magnesium carbonate is then calcined to produce magnesium oxide products consisting of the pseudomorph particles. The invention includes the magnesium carbonate compounds described herein, as well as the magnesium oxide compositions produced therefrom.

Indications are that the actual conditions which must be observed in the process depend somewhat upon the apparatus used. Therefore, no attempt is made herein to set forth conditions holding for all forms of equipment. The following examples set forth a method found to give the required results when the apparatus described therein is used.

Example I

Two solutions were prepared, one containing 413 grams of sodium carbonate in 6.25 liters of water, and the other containing 826 grams of magnesium chloride crystals (52% $MgCl_2$) in 6.25 liters of water. The sodium carbonate solution was placed in a four gallon vessel equipped with a motor driven propeller-agitator and heated to a temperature of 85° C. The magnesium chloride solution was heated to a temperature of 85° C. in a separate vessel. Then with the two solutions at the stated temperature and while agitating the carbonate solution by means of the propeller agitator, all of the chloride solution was added to the carbonate solution in 15 seconds time. The agitation was continued for an additional 45 seconds. At the end of this period the agitator was stopped and the resulting slurry was allowed to stand while cooling in quiescent condition for 30 minutes. At the end of the 30 minute period the slurry was filtered, and a sample of the precipitate of magnesium carbonate was dried at 110° C. for purposes of particle study and analysis.

The dried precipitate was then examined microscopically to determine its particle shape and particle size distribution. Results of this examination showed the magnesium carbonate composition to be composed of spherulitic plate-like discs of extremely uniform particle size distribution. The weighted average diameter of the particles was 7.1 microns. 62.3% of the particles were of an average diameter of 5.7 microns, 36.8% were of an average diameter of 9.5 microns and 0.9% were of average diameter of 1.9 microns. There were substantially no particles of less than 1 micron or more than 10 microns in size. Thus, 99.1% of the particles did not vary more than about 4 microns in average diameter.

The remainder of the magnesium carbonate precipitate was then transferred to a muffle furnace and calcined at a temperature between 380° C. and 400° C. for 20.5 hours. The calcined product was then removed from the furnace, allowed to cool, and examined microscopically. The particles of the calcined composition appeared as spherulitic plate-like discs of the same shape as those of the carbonate and may thus be termed pseudomorphs thereof.

The calcined product exhibited even more uniform particle size distribution than the carbonate product. Of the total particles present, 95.5% were of an average diameter of 5.7 microns, 0.3% of an average diameter of 1.9 microns and 4.2% of an average diameter of 9.5 microns. The weighted average diameter of all the particles was 5.8 microns, this figure being somewhat smaller than the weighted average diameter of the carbonate. The apparent density of the calcined product was about 20 pounds per cubic foot, and its filter-rate was 39.7 gal./sq. ft./hour. The method of determining the filter rate was by agitating together 45 grams of the magnesium oxide composition and 300 grams of a viscous lubricating oil at 400° F. for 20 minutes and then filtering through a Buchner filter, the number of gallons filtered per hour per square foot of filter surface representing the filter rate.

The determination of particle sizes and size-frequency designated herein were made with a microscope equipped with an eyepiece micrometer calibrated against a Bausch and Lomb stage micrometer. The scale dimensions were equivalent to 3.8 microns with a 4 mm. objective and to 1.6 microns with a 1.9 mm. objective. The class materials taken were 0–1, 1–2, 2–3, 3–4, 4–5 micrometer scale divisions, the number of particles within each size-class being determined by moving the specimen beneath the scale by means of a mechanical stage and classifying each particle passing beneath the scale divisions on the basis of its diameter measured lengthwise of the scale. The numerical average of the upper and lower limits of each class was taken as the class size. All the particles in the portion of the specimen traversed were counted, and the frequencies of the various sizes in from 200 to 300 particles were tabulated. The numerical average particle size, or weighted average diameter referred to herein, was calculated by summing the number of particles in each size-class multiplied by the class-size, and dividing the totals of their products by the total number of particles.

Example II

The following data set forth particle size distribution of additional magnesium compounds of the invention which were prepared by the method set forth above.

A composite precipitate consisting of basic magnesium carbonates from three different batches each of which had been precipitated by the method described above showed the following particle size distribution:

| Average diameter (microns) | Per cent of total |
|---|---|
| 2.85 | 14.3 |
| 4.75 | 32.6 |
| 6.65 | 44.1 |
| 9.5 | 8.1 |
| 13.3 | 0.9 |

Weighted average diameter—5.8 microns.
Range of particle sizes—2 to 14 microns.

This magnesium carbonate after calcining under the conditions set forth in Example I gave a magnesium oxide composition having the following particle size distribution:

| Average diameter (microns) | Per cent of total |
| --- | --- |
| 3.3 | 26.5 |
| 3.76 | 61.3 |
| 6.65 | 4.6 |
| 9.5 | 7.6 |

Weighted average diameter—4.2 microns.

The filter-rates characterizing the magnesium-oxide products of the invention are very high as compared to those of other magnesium oxides not having uniform particle size distribution. The latter magnesium oxides show filter-rates on the order of 5 gals./sq. ft./hour and lower, by the same test for determining filter-rates and under the same test conditions as described in Example I.

The basic magnesium carbonate of this invention has the following approximate composition before drying:

$$3MgCO_3.Mg(OH)_2.9H_2O$$

Upon drying at 110° C. this material loses about three molecules of water to give a composition of about the following formula $$3MgCO_3.Mg(OH)_2.6H_2O$$

Upon calcination water and carbon dioxide are driven off to an extent depending upon the calcining conditions. Calcination under the conditions described in the examples results in compositions containing roughly 70 to 90% MgO and the remainder water and $CO_2$.

The above described examples will suffice as a disclosure of a method by which the products of this invention can be produced. Numerous experiments, using the apparatus described, indicate that the procedure set forth in the examples must be followed closely regarding the precipitation conditions.

The results of these experiments indicate that when employing the reactants and apparatus described the following conditions are apparently critical. The reactant solutions should not be of such high concentration as to form a semi-fluid slurry after the reaction. Solutions of sodium carbonate and of magnesium chloride of not over about 6% concentration are generally satisfactory, since upon reaction they result in a thin, easily stirred slurry. The magnesium chloride solution should be added to the sodium carbonate solution; addition in reverse order produces undesirable particle size distribution. The solutions should be reacted hot. The temperature of the solutions at the time of mixing should not be substantially below 50 or 60° C., and should be preferably between 80 and 90° C. The magnesium chloride solution should be added to the carbonate solution rapidly, with effective agitation. Experiments show that agitation is necessary, but that it should not be extended for more than a few minutes after all of the magnesium chloride solution has been added. A ten minute period of agitation after all of the chloride solution had been added was found to be too long. A relatively long period, subsequent to the reaction period, must be allowed during which the slurry is permitted to cool in quiescent condition. This standing or digestion period is thought to be responsible at least in part for the particle size distribution characterizing the products of this invention, since during this period there apparently occurs a selective particle growth and desirable re-distribution of particle sizes. Larger particles apparently grow while the smaller particles such as "fines" dissolve in the liquid portion of the slurry.

While the above described method of preparing the products of the invention has been given in detail, it should be clear that the invention is directed to the new magnesium compositions as set forth in the appended claims and is not to be limited as respects particular methods for their preparation.

I claim:
1. A finely divided composition comprising essentially magnesium oxide, the particles of said composition comprising plate-like discs made up largely of crystals radiating from a common center a predominance of said particles being of uniform particle size.
2. A finely divided composition comprising essentially magnesium carbonate, the particles of said composition consisting substantially entirely of plate-like discs of relatively small average particle size a preponderance of which are of uniform particle size said plate-like discs being made up largely of crystals radiating from a common center.
3. A finely divided composition comprising a magnesium compound selected from the group consisting of magnesium oxide and magnesium carbonate, the sizes of the particles of said compound falling within a relatively narrow overall range, and a predominance of said particles falling within a size range more restricted than said overall range, substantially all of said particles being in the form of plate-like discs made up largely of crystals radiating from a common center.
4. A composition comprising essentially magnesium oxide and prepared by calcination of an artificially precipitated basic magnesium carbonate, said product being characterized by high apparent density and consisting substantially entirely of particles of plate-like disc form made up largely of crystals radiating from a common center a preponderance of said particles being of uniform size.
5. A finely divided artificially precipitated basic magnesium carbonate consisting of particles appearing as plate-like discs made up largely of crystals radiating from a common center, said composition being substantially free from "fines" and having a preponderance of particles of uniform size.
6. A finely divided composition of high apparent density comprising essentially magnesium oxide, the particles of said composition being in the form of plate-like discs made up largely of crystals radiating from a common center, at least about 90% of which do not deviate more than 4 or 5 microns in average diameter.
7. A composition comprising essentially magnesium oxide having particles of plate-like disc form made up largely of crystals radiating from a common center, a preponderance of which are of uniform size, said composition having been prepared by precipitating under controlled conditions a basic magnesium carbonate having the approximate composition

$$3MgCO_3.Mg(OH)_2.9H_2O$$

and heating said basic magnesium carbonate to produce said composition.

CHARLES C. WINDING.